United States Patent
Kothari et al.

(10) Patent No.: US 8,081,413 B2
(45) Date of Patent: Dec. 20, 2011

(54) INTRINSICALLY SAFE ETHERNET-BASED COMMUNICATION

(75) Inventors: Ajay Kothari, Lowell, MA (US);
Naresh Molleti, Lowell, MA (US);
Parag Shah, Billerica, MA (US)

(73) Assignee: Azonix Corporation, Billerica, MA (US)

( * ) Notice: Subject to any disclaimer, the term of this patent is extended or adjusted under 35 U.S.C. 154(b) by 499 days.

(21) Appl. No.: 11/568,567

(22) PCT Filed: Oct. 5, 2005

(86) PCT No.: PCT/US2005/035877
§ 371 (c)(1),
(2), (4) Date: Nov. 1, 2006

(87) PCT Pub. No.: WO2007/040539
PCT Pub. Date: Apr. 12, 2007

(65) Prior Publication Data
US 2008/0285186 A1    Nov. 20, 2008

(51) Int. Cl.
*H02H 3/22* (2006.01)
(52) U.S. Cl. ............... 361/119; 361/56; 361/111
(58) Field of Classification Search ............ 361/119
See application file for complete search history.

(56) References Cited

U.S. PATENT DOCUMENTS

| | | | |
|---|---|---|---|
| 4,241,305 A * | 12/1980 | Dickerson | 324/532 |
| 4,598,331 A * | 7/1986 | Legatti | 361/46 |
| 4,691,384 A | 9/1987 | Jobe | |
| 5,014,156 A | 5/1991 | Bruch et al. | |
| 6,111,738 A | 8/2000 | McGoogan | |
| 6,397,322 B1 | 5/2002 | Voss | |
| 6,608,264 B1 * | 8/2003 | Fouladpour | 200/51.03 |
| 7,236,342 B2 * | 6/2007 | Vazach et al. | 361/119 |
| 2001/0031046 A1 * | 10/2001 | Troibner et al. | 379/202.01 |
| 2002/0063621 A1 * | 5/2002 | Tseng et al. | 340/2.7 |
| 2002/0097532 A1 * | 7/2002 | Voldman | 360/323 |
| 2004/0085240 A1 | 5/2004 | Faust | |

FOREIGN PATENT DOCUMENTS

| | | |
|---|---|---|
| DE | 41 30 704 A1 | 5/1993 |
| EP | 717485 | 6/1996 |

OTHER PUBLICATIONS

Havens, Phillip "LAN/WAN Ethernet Overcurrent and Overvoltage Protection" Electronic Design, Penton Media, Cleveland, Ohio, US; vol. 48, No. 9; May 1, 2000; pp. 126, 128 (XP000945789).

* cited by examiner

*Primary Examiner* — Rexford Barnie
*Assistant Examiner* — Tien Mai
(74) *Attorney, Agent, or Firm* — IP Authority, LLC; Ramraj Soundararajan (57) ABSTRACT

An intrinsically safe network switch (200) includes five electronically isolated ports, four for connections in hazardous areas (206-1, 206-2, 206-3, 206-4) and one for receiving an unsafe Ethernet input (204). The device may use 10/100 mbps Ethernet cables and connectors and provides speed and activity LED indicators for each port. The device may be din rail-mountable, wall mountable, or desk mountable, and includes an integral heat sink for cool operation. The device incorporates internal barriers and isolated circuitry to guarantee safety and high-integrity signals with resistance to ambient EMI/RFI radiation. This network switch (200) could be any Ethernet communication devices such as hub, managed or unmanaged switch etc. Also, it could have total "n" number of ports (isolated or un-isolated) with 1 port for safe area and "n–1" port of hazardous area. The number of ports for safe and hazardous area can be varied to meet specific application requirements.

21 Claims, 4 Drawing Sheets

INTRINSICALLY SAFE ETHERNET-BASED COMMUNICATION

RELATED APPLICATION

This application is a national phase entry in the United States for international application PCT/US2005/035877 filed Oct. 5, 2005, which is incorporated herein by reference in its entirety.

TECHNICAL FIELD

The present invention relates generally to the field of communications in hazardous area. More specifically, the present invention is related to cost-effective intrinsically safe Ethernet-based communications based on IEEE 802.3/u,z/ab/ae.

BACKGROUND OF THE INVENTION

Based on the prior art known in the industrial automation market, Ethernet has become a standard choice for digital communication between various pieces of communication hardware. However, very few choices exist for Ethernet-based communication in hazardous areas. One known prior art solution involves the use of a specialized copper cable and connector combination. Another prior art solution involves using fiber optic cables. Both of the above-mentioned prior art solutions suffer from many drawbacks, one of which is the cost of implementing such solutions. Both the above-mentioned prior art solutions are expensive and severely limit the ease of use and maintenance in the field.

For the electrical signals that are not I.S. in hazardous area, the wiring regulations are very stringent and permits very specialized cables often requiring armor (for physical protection against cable cuts) and specialized methods of cable entry and termination. In case of connectors for easy connection mechanism, the connectors must meet the explosion-proof (or flame-proof) requirements. These specialized connectors are not offered for wide range of applications and are expensive.

The fiber (optical link) does not have any electrical energy hence are easily acceptable in hazardous area. The fiber cables are delicate hence easy to break and very difficult to repair in the field. In many industrial applications the fiber cables require special jacket because of environmental conditions and this makes them expensive. In applications where the equipment is permanently mounted, the fiber connectors are not necessary. But in the application where equipments are frequently moved, the connectors are desired. These connectors are expensive and are prone to malfunction due to dust, and are, hence, difficult to maintain.

Since the fiber optic solution is cost-prohibitive and the non-I.S. copper cable and connector solution is not ideal, there is a need for an inexpensive I.S. Ethernet solution. Some of the major benefits of I.S. Ethernet are: (1) industry standard (2) use of standard cable and connector that is widely available at a very cheap cost because the design is I.S. and (3) ability to hot-plug the network. This would reduce that operating cost in the field dramatically and make it user friendly for installation, maintenance, etc.

The serial link is a common method of communication in industrial automation world. There are several advantages of using the serial communication. Some of these are: ease of implementation, lower cost of cabling, very common, hence, ease of finding the alternate and compatible devices etc. Some of the major benefits in the Hazardous area are (1) the ability to make the design Intrinsically Safe due to reduced number of channels (as compared to parallel devices), and (2) the lower cost of implementation for devices, cables and installation.

However, the industrial automation world is moving towards Ethernet as a standard method of communication. This is mainly driven by need for higher communication bandwidth (10 MBPS or greater) than what other serial protocols could provide (typically 1 MBPS or lower). In addition, Ethernet provides users an industrial network that has a lower cost of ownership with improved adaptability for their changing business needs. This, combined with widespread availability and market familiarity, continues to drive Ethernet's use in industrial automation applications for a broad range of industries. Now the Ethernet is widely offered in PLCs as well as devices.

In certain industries, the devices must meet the Intrinsically Safe requirements. The I.S designs are low voltage, low current and has limited power, capacitance and inductance such that even in fault conditions the energy is not sufficient to cause an explosion.

So far, there is no solution available that offers the I.S. Ethernet. One of the inherent problem in I.S. design is the speed as the I.S. design requires putting fuse, Zeners (or diodes) and resistor to limit the voltage and current under fault conditions. These components act like Resistor-Capacitor circuit that distorts frequency characterization of the high speed signals preventing high-speed communication.

The following references provide for a general teaching with regard to communications in hazardous areas, but they fail to provide for the claimed invention's robust method and system of an intrinsically safe Ethernet circuit arrangement that is cost-effective.

The patent to Kessler et al. (U.S. Pat. No. 6,154,683), assigned to Rockwell Technologies, LLC, provides for a Low Voltage Industrial Control System Providing Intrinsically Safe Operation. Hazardous area 20 is provided with intrinsically safe I/O rack 24', including communications module 30', which provides high speed serial data communication between control points 36 in the hazardous area and control terminal 22 located outside of the hazardous area over serial link 28' through penetration circuit 34 to serial link 28 located outside of the hazardous area. Kessler et al. mention the use of a high-speed serial bus and fails to address bandwidth limitations. Also, the general purpose serial link in the industrial control world has a different meaning than Ethernet. Ethernet is not viewed as a serial link due to tight timing requirements.

The patent application publication to Vazach et al. (2005/0024160 A1) provides for an In-Line Passive Barrier for Intrinsically Safe Communication Network. Network barrier 20 is mounted on DIN rail 21 along with communication module 16 of a standard high speed serial network 18, such as Ethernet, and the two are connected by cabling. The barrier is also connected by cabling to network card 16' of intrinsically safe rack 12' located in hazardous area 17. The intrinsically safe rack includes I/O modules 14 that communicate with controlled equipment 22 located in the hazardous area (see paragraphs 44-46). The barrier mentioned here is for co-axial cable for high-speed serial communication. The invention here is based on standard ethernet communication with twisted pair cables (ex. CAT5, CAT5e, CAT6) cable using standard RJ145 connector.

The patent to Lewis et al. (U.S. Pat. No. 5,712,631), assigned to Halliburton Company, provides for an Intrinsically Safe Data Network. Provided is a boundary crossing connector, which includes one or more intrinsic safety barriers, that connects a communication interface means located inside a hazardous zone to external processing means. In this patent, it should be noted that the Data Network corresponds to an RS-485 interface (not Ethernet), the implementation is of which is very different than Ethernet.

Whatever the precise merits, features, and advantages of the above cited references, none of them achieves or fulfills the purposes of the present invention.

DISCLOSURE OF INVENTION

The present invention provides for a computer-based system with an intrinsically safe barrier for use in a hazardous area comprising: (a) a fuse receiving an unsafe signal from a first network device; (b) a voltage clamping device comprising a plurality of back-to-back diodes; (c) a current limiting resistance, wherein a value of the current limiting resistance depends on a clamping voltage value associated with the voltage clamping device. The intrinsically safe barrier clamps input voltage and limits short circuit current to provide an intrinsically safe signal as an output to a second network device.

The present invention also provides for an intrinsically safe network switch for use in a hazardous area comprising: (a) a power input; (b) an input port to receive an unsafe network input signal, wherein the input port works in conjunction with a first intrinsically safe barrier; (c) at least one output port to transmit a safe network output signal, wherein the output port works in conjunction with a second intrinsically safe barrier. In this embodiment, each of the first and second intrinsically safe barriers further comprises a fuse, a voltage clamping device comprising a plurality of back-to-back diodes, and a current limiting resistance. In this embodiment, a value of the current limiting resistance depends on a clamping voltage value associated with the voltage clamping device, and the first and second intrinsically safe barriers clamp input voltage and limit short circuit current to provide an intrinsically safe output signal.

The present invention also provides for an intrinsically safe network switch for use in a hazardous area, wherein the network-based switch is used to provide both an intrinsically safe data signal and an intrinsically safe power signal. The intrinsically safe network switch according to this embodiment comprises: (a) a power input working in conjunction with a first intrinsically safe barrier; (b) an input port to receive an unsafe network input signal, wherein the input port works in conjunction with a second intrinsically safe barrier; and (c) at least one output port to transmit a safe network output signal, wherein the output port works in conjunction with a third intrinsically safe barrier, each of said first, second, and third intrinsically safe barriers further comprising a fuse, a voltage clamping device comprising a plurality of back-to-back diodes, and a current limiting resistance. In this embodiment, a value of the current limiting resistance depends on a clamping voltage value associated with the voltage clamping device, and the first, second, and third intrinsically safe barriers clamp input voltage and limit short circuit current to provide an intrinsically safe output signal.

The present invention also provides for an intrinsically safe barrier protecting an integrated circuit in a hazardous area, wherein the integrated circuit performs network-based communications and the intrinsically safe barrier comprises: (a) a fuse receiving an unsafe signal from the integrated circuit; (b) a voltage clamping device comprising a plurality of back-to-back diodes; (c) a current limiting resistance, wherein a value of the current limiting resistance depends on a clamping voltage value associated with the voltage clamping device. In this embodiment, the intrinsically safe barrier, when used in conjunction with the integrated circuit, clamps input voltage and limits short circuit current to provide an intrinsically safe integrated circuit output signal.

BEST MODE FOR CARRYING OUT THE INVENTION

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

The present invention provides for a system and method implementing Intrinsically Safe (IS) Ethernet based on the IEEE standard, wherein the system and method can be used in Hazardous area to attain a high-bandwidth (e.g., 10 MBPS, 100 MBPS or greater) connection using standard CAT5, 5e or 6 cable and standard RJ45 connector. Additionally, a live disconnect of the ports can be performed, if needed, in a hazardous area.

The present invention also provides for a system and method that provides intrinsically safe Power over Ethernet (PoE) for the use in a hazardous area, wherein a single standard Ethernet cable is used for both communication and power in Hazardous area.

Figure 1:
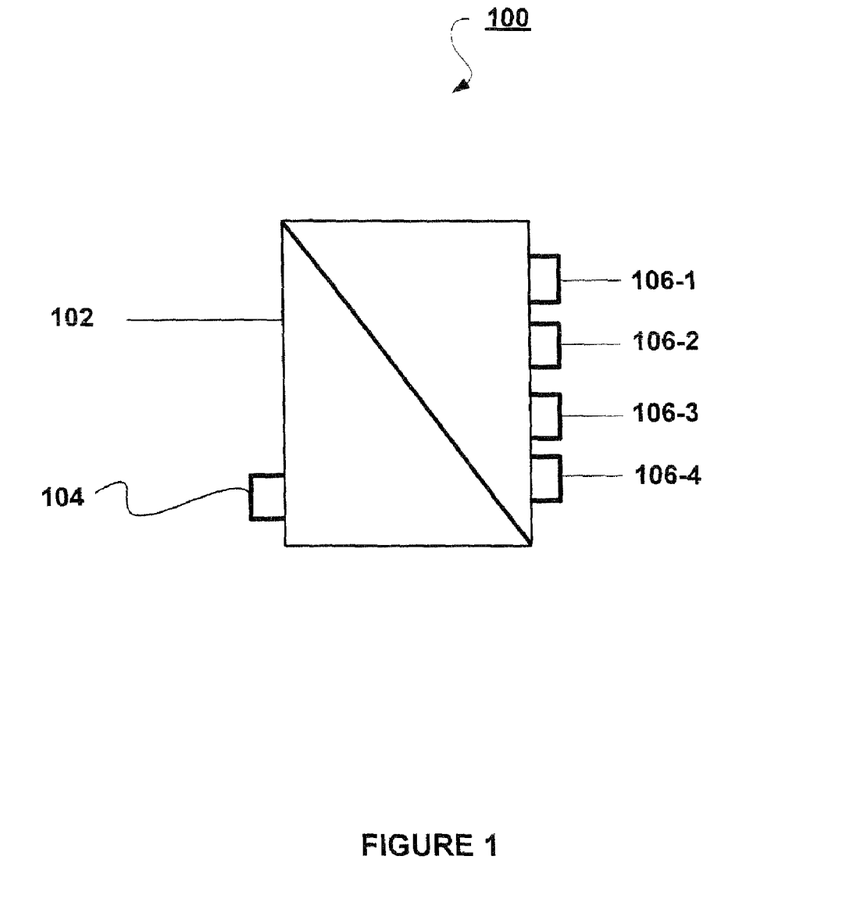
FIG. 1 illustrates a network switch according to the present invention.

FIG. 1 illustrates an Ethernet switch 100 according to the present invention. The Ethernet switch comprises an input D.C. power 102, an input port 104 for receiving an input such as a CAT5 networking cable, and one or more output ports 106-1 through 106-4.

Figure 2:
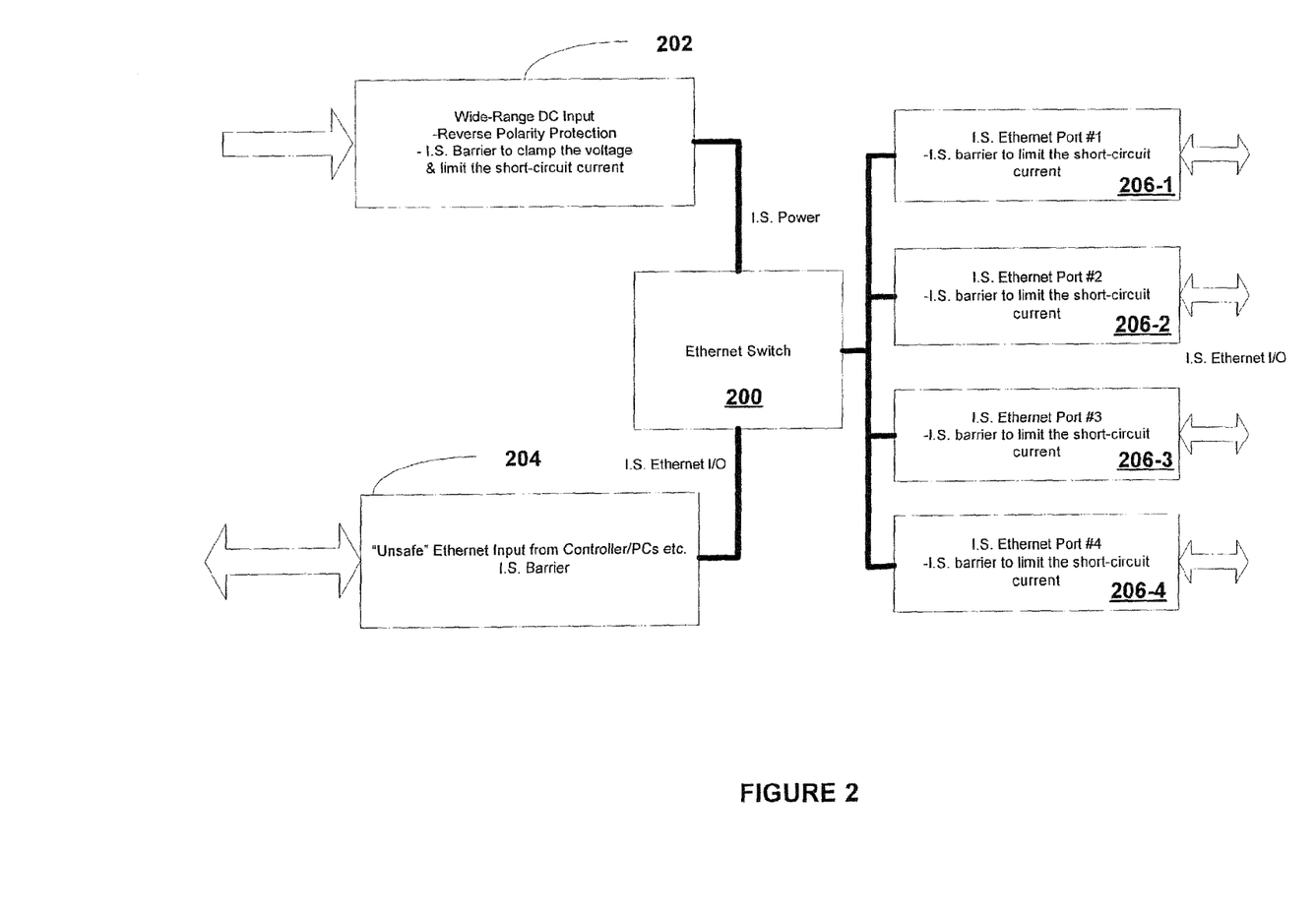
FIG. 2 illustrates another view of the Ethernet switch used in accordance with the teachings of the present invention.

FIG. 2 illustrates another view of the Ethernet switch used in accordance with the teachings of the present invention. FIG. 2 illustrates an intrinsically safe network switch 200 for use in a hazardous area, wherein the network-based switch is used to provide both an intrinsically safe data signal and an intrinsically safe power signal. The intrinsically safe network switch according to this embodiment comprises: (a) block 202 representing a power input working in conjunction with a first intrinsically safe barrier to provide an intrinsically safe power output; (b) block 204 representing an input port to receive an unsafe network input signal, wherein the input port works in conjunction with a second intrinsically safe barrier; and (c) blocks 206-1 through 206-4 representing one or more output ports to transmit a safe network output signal, wherein the output port works in conjunction with a third intrinsically safe barrier, each of said first, second, and third intrinsically safe barriers further comprising a fuse, a voltage clamping device comprising a plurality of back-to-back diodes, and a current limiting resistance. In this embodiment, a value of the current limiting resistance depends on a clamping voltage value associated with the voltage clamping device, and the first, second, and third intrinsically safe barriers clamp input voltage and limit short circuit current to provide an intrinsically safe output signal.

Figure 3:
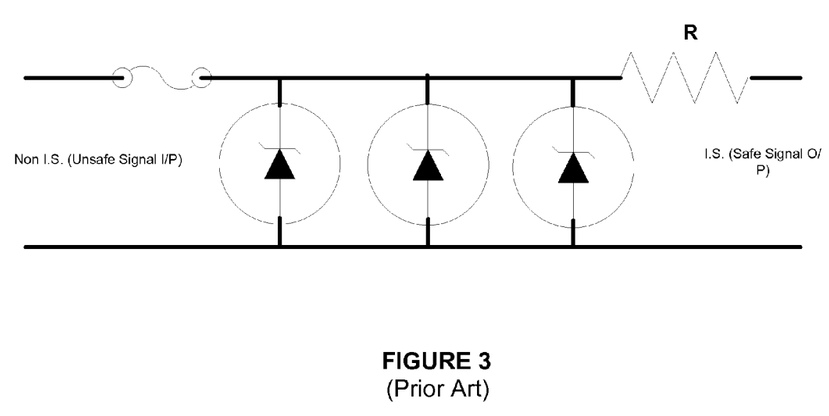
FIG. 3 illustrates such a prior art scenario using Zener diodes.
Figure 4:
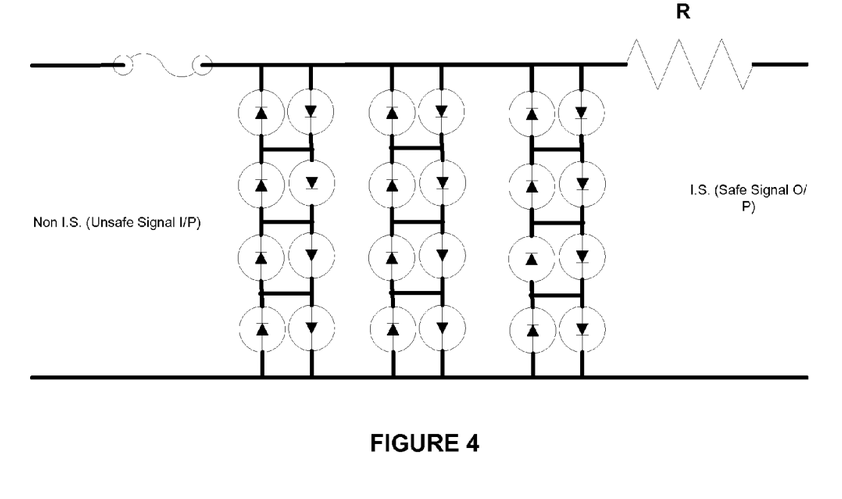
FIG. 4 illustrates the present invention's implementation of back-to-back diodes.

As shown in FIG. 4, in the preferred embodiment, the present invention's system and method uses back-to-back diodes (instead of Zener diodes). The use of back-to-back diodes provide better control over forward voltage conduction as compared to Zeners for which the V-I characteristic knee is poor for voltages below 4.7V. FIG. 3 illustrates such a prior art scenario using Zener diodes. One disadvantage associated with circuits implementing Zener diodes is that when such circuits operate at a lower voltage (i.e., below 4.7V), the Zener diodes conduct (i.e., allows the current to flow through them), a limitation that is not desirable. With the use of diodes in place of Zeners, the forward (and reverse) voltage can be better controlled as the typical diode start conducting at 0.7V. However, more diodes are required to make sure the diode channel does not conduct in normal operation.

To meet the I.S. regulation, the output resistance value is derived from the clamping voltage—the higher the voltage, the higher the resistance value. Hence, by lowering the clamping voltage, the output resistance can be lowered (which is desired for high frequency signals).

To meet the safety rating of the I.S. regulation, the power in the voltage clamping devices are calculated as following:

Power=Diode Voltage*Diode Tolerance*Fuse Current*Safety Factor for Fuse. It should be noted that to use the zener diode as an infallible component, the temperature derating curve and safety factor should also be considered to derive at the power rating. Since the diode forward voltage is significantly low as compared to Zener diodes, the smaller package of diode (fast-signal diodes) can be used.

With larger diode packages (including Zener diodes), due to the silicon junction characteristics, the parasitic capacitance is high. Similarly, with the use of smaller diodes, the parasitic capacitance is low. The parasitic capacitance in the voltage clamping devices, along with fuse resistance and current limit resistance significantly changes the spectral response of the Ethernet channel thereby severely band-limiting the transmission channel. This is not good for high speed Ethernet signals as it causes Inter symbol Interference (ISI) and subsequently creating a lot of bit errors. By controlling the current limit resistance "R", the parasitic capacitance "C" and specifying the package size of these components, the spectral characteristics of the channel can be modified to minimize distortion and control Inter symbol Interference (ISI). The same technique can be applied to even higher frequency (bandwidth) signals as well.

Figure 5:
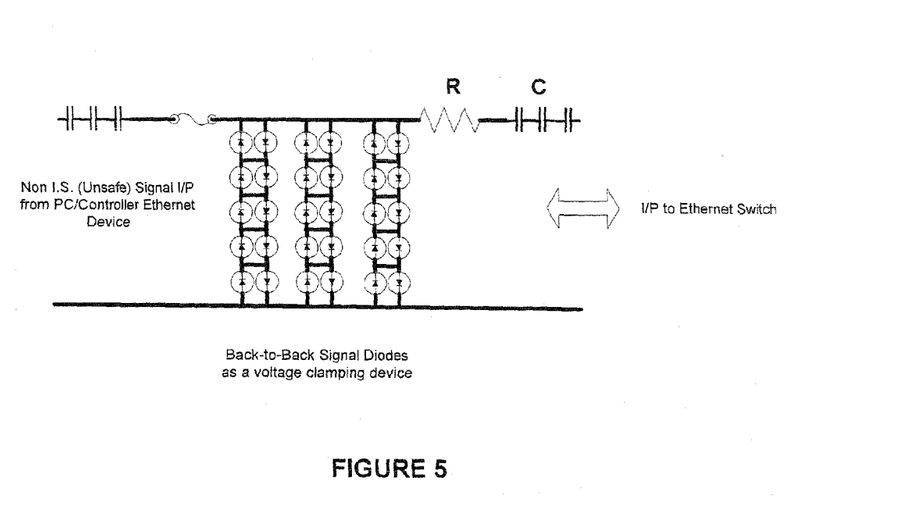
FIG. 5 illustrates an electrical schematic describing I.S. Barrier for "Unsafe" signals coming from PC/Controller Ethernet I/O.
Figure 6:
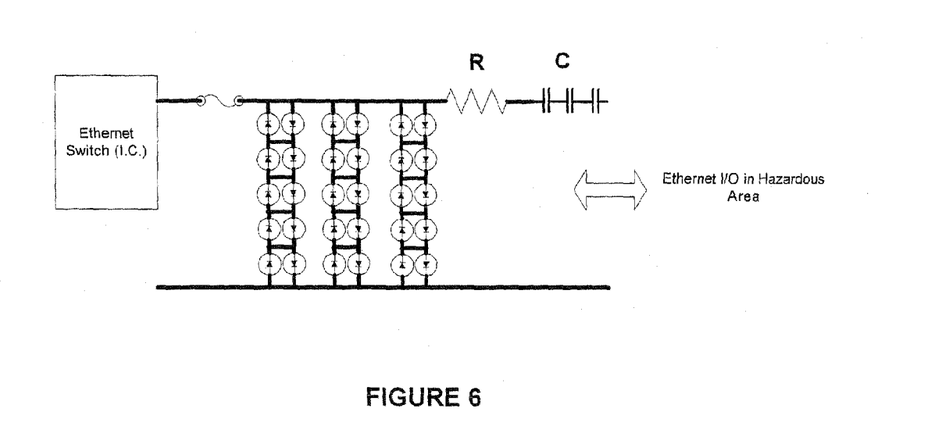
FIG. 6 illustrates an electrical schematic describing I.S. barrier for signals going into a hazardous area.

According to the present invention, as shown in FIGS. 4-6, to rely on the diodes as a safety component to clamp the voltage, back-to-back diodes are used. In addition to back-to-back diodes, as per I.S. standards, redundant channels of voltage clamping circuitry is required. The parasitic capacitors add up when connected in parallel but there are more numbers of diodes in each line to get to the desired voltage (e.g., assuming diode forward voltage –0.7V and voltage clamp is desired at 4.9V, 7 such diodes are required.) Adding these diodes in series puts the parasitic capacitance in series hence the total capacitance drops. Therefore, adding more diodes in series offer the same parasitic capacitance as the diodes in 1 channel (including redundancy).

FIG. 5 illustrates an electrical schematic describing I.S. Barrier for "Unsafe" signals coming from PC/Controller Ethernet I/O. The use of a fuse, a voltage clamping device, and a resistor is in accordance with the I.S. standard. The use of diodes as a voltage clamping device offers advantages as described in earlier section. Use of "blocking capacitors" offers high voltage isolation necessary for operation in industrial applications. The isolation obtained by this method is 1500V RMS. However, it should be noted that the isolation voltage can be increased or decreased based on the capacitor selection, and hence should not be used to limit the scope of the invention. In addition to high voltage isolation, the use of blocking capacitor also offers an excellent protection to the fuse in case or erroneous shorts that occurs in regular day-to-day operation. Without such protection, the device could fail frequently and lower the system reliability.

FIG. 6 illustrates an electrical schematic describing I.S. Barrier for signals going into a hazardous area. There are 4 ports as shown in the figure, but the number of output ports should not be used to limit the scope of the invention. The present invention's teachings can be used to increase or reduce the total number of ports available, without departing from the scope of the present invention.

The Ethernet I/O signals interface to an Ethernet integrated circuit (I.C.). This I.C. can be any standard I.C. capable of doing the desired operation. For example, the IC can be a "managed" switch or an "unmanaged" switch. The selection of 'R' is based on the I.S. standards and is derived from the selection of voltage clamping circuit. The fuse used here is to limit the power rating of the "R". The power rating of "R" can be derived from 2 possible ways.

a. Power rating of "R"=$V^2$(clamping voltage)/R (with appropriate tolerance and safety rating), or     b. Power rating of "R"=$I^2$(Fuse rating)*R (with appropriate tolerance and safety rating).

In this case, the use of a fuse allows a very small package "R" desired for high frequency operation. The use of blocking capacitors on the output offered the same advantage as described earlier.

The Ethernet I.C. can be replaced with any other I.C. that is required for high bandwidth (high frequency) communication (e.g., greater than or equal to 10 MBPS). For example, in one embodiment, the I.C. is an "unmanaged" switch, and in another embodiment, the basic I.C. can be replaced to create a "managed" switch.

The current design shows the design of 4-port Ethernet switch. This design increases complication as well as cost. It should be noted that the teachings of the present invention can be used to implement an application that requires only a single channel using the "Unsafe Ethernet I/O" barrier circuitry.

The blocking capacitors used in the design offer good isolation (and impedance) at the lower frequency (such as 50/60 Hz) that is more common in the plants/installations. These capacitors offer very low impedance at the operating frequency and, hence, are not sufficient to limit the I.S. current. This forces the use of current limiting "R" in the design. With the selection of better capacitors that offer adequate "R" at the operating frequency, it is possible to eliminate the current limiting "R". However, this requires extensive testing to prove that these are sufficient to restrict the short circuit current as per I.S. standards.

As described in FIG. 2, block 204 represents the I.S. barrier for the signal from non I.S. (unsafe) signal I/P from OC/Controller ethernet devices. In this invention, the block 204 is designed as described in FIG. 5. The block 204 can be replaced by galvanic isolation created using optical methods (such as back-to-back copper-to-fiber & fiber-to-copper converter preventing any electrical energy entering the device from unsafe area) or by transformer isolation. These concepts were considered during the design concepts but were not implemented as it would increase the cost of the final product.

It should be noted that the teachings of the present invention can be combined to provide an intrinsically safe solution to transfer power as well as signal on the same cable (i.e., Power over Ethernet or PoE based on IEEE 802.3af). Power-over-Ethernet technology allows network switches, wireless LAN Access Points and other appliances to receive power as well as data over existing LAN cabling, without needing to modify the existing Ethernet infrastructure.

A system and method has been shown in the above embodiments for the effective implementation of cost-effective intrinsically safe Ethernet-based communications. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by the number or ports, type of communication circuit, software/program, specific hardware, or specific implementations such as Power-over-Ethernet.

What is claimed is:

1. A computer-based system with an intrinsically safe barrier for Ethernet communication in a hazardous area comprising:
   a. a fuse receiving an unsafe Ethernet signal from a first network device;
   b. a voltage clamping device comprising:
      at least a first anti parallel diode pair arranged on top and electrically connected to a second anti parallel diode pair in a first column configuration;
      at least a third anti parallel diode pair arranged on top and electrically connected to a fourth anti parallel diode pair in a second column configuration;
      at least a fifth anti parallel diode pair arranged on top and electrically connected to a sixth anti parallel diode pair in a third column configuration;
   c. a current limiting resistance, wherein a value of said current limiting resistance depends on a clamping voltage value associated with said voltage clamping device, and
   said first anti parallel diode pair only electrically connected to said fuse, said current limiting resistance, said second anti parallel diode pair, said third anti parallel diode pair, and said fifth anti parallel diode pair;
   said third anti parallel diode pair only electrically connected to said first anti parallel diode pair, said fourth anti parallel diode pair, said fifth anti parallel diode pair, said fuse, and said current limiting resistance;
   said fifth anti parallel diode pair only electrically connected to said first anti parallel diode pair, said third anti parallel diode pair, said sixth anti parallel diode pair, said fuse, and said current limiting resistance;
   said intrinsically safe barrier clamping input voltage and limiting short circuit current to provide an intrinsically Ethernet safe signal as an output to a second network device.

2. The computer-based system with an intrinsically safe barrier for Ethernet communication in a hazardous area, as per claim 1, wherein said first and second network devices are Ethernet-based network devices.

3. The computer-based system with an intrinsically safe barrier for Ethernet communication in a hazardous area as per claim 1, wherein, for high-frequency signals, said plurality of anti-parallel diode pairs are configured to lower said clamping voltage value, thereby lowering said current limiting resistance.

4. The computer-based system with an intrinsically safe barrier for Ethernet communication in a hazardous area as per claim 1, wherein power in said voltage clamping device is calculated as follows:

Power=Diode Voltage*(1+Diode Tolerance)*Fuse Current*Fuse Safety Factor.

5. The computer-based system with an intrinsically safe barrier for Ethernet communication in a hazardous area as per claim 1, wherein said intrinsically safe barrier further comprises blocking capacitors for high-voltage isolation.

6. The computer-based system with an intrinsically safe barrier for Ethernet communication in a hazardous area as per claim 1, wherein said fuse is used to limit power rating of said current limiting resistor, R, and said power rating is given by:

Power Rating of '$R$'=$V_c^2/R$, wherein $V_c$ is the clamping voltage.

7. The computer-based system with an intrinsically safe barrier for Ethernet communication in a hazardous area as per claim 1, wherein said fuse is used to limit power rating of said current limiting resistor, R, and said power rating given by:

Power Rating of '$R$'=$I_F^2*R$, wherein $I_F$ is the fuse rating.

8. The computer-based system with an intrinsically safe barrier for Ethernet communication in a hazardous area as per claim 1, wherein said first network device is any of the following: a switch or a router.

9. The computer-based system with an intrinsically safe barrier for Ethernet communication in a hazardous area as per claim 1, wherein said second network device is any of the following: a switch or a router.

10. An intrinsically safe network switch for use in a hazardous area comprising:
   a. a power input;
   b. an input port to receive an unsafe network input signal, said input port working in conjunction with a first intrinsically safe barrier;
   c. at least one output port to transmit a safe network output signal, said output port working in conjunction with a second intrinsically safe barrier, each of said first and said second intrinsically safe barriers further comprising:
      a fuse receiving an unsafe Ethernet signal from a first network device;
      a voltage clamping device comprising
         at least a first anti parallel diode pair arranged on top and electrically connected to a second anti parallel diode pair in a first column configuration;
         at least a third anti parallel diode pair arranged on top and electrically connected to a fourth anti parallel diode pair in a second column configuration;
         at least a fifth anti parallel diode pair arranged on top and electrically connected to a sixth anti parallel diode pair in a third column configuration;
      a current limiting resistance, wherein a value of said current limiting resistance depends on a clamping voltage value associated with said voltage clamping device, and
      said first anti parallel diode pair only electrically connected to said fuse, said current limiting resistance, said second anti parallel diode pair, said third anti parallel diode pair, and said fifth anti parallel diode pair;

said third anti parallel diode pair only electrically connected to said first anti parallel diode pair, said fourth anti parallel diode pair, said fifth anti parallel diode pair, said fuse, and said current limiting resistance;

said fifth anti parallel diode pair only electrically connected to said first anti parallel diode pair, said third anti parallel diode pair, said sixth anti parallel diode pair, said fuse, and said current limiting resistance;

wherein a value of said current limiting resistance depends on a clamping voltage value associated with corresponding voltage clamping device, and said first and second intrinsically safe barriers clamp input voltage and limit short circuit current to provide an intrinsically safe output signal.

11. The intrinsically safe network switch for use in a hazardous area, as per claim 10, wherein said network switch is an Ethernet-based network switch.

12. The intrinsically safe network switch for use in a hazardous area, as per claim 10, wherein, for high-frequency signals, said plurality of anti-parallel diode pairs are configured to lower said clamping voltage value, thereby lowering said current limiting resistance.

13. The intrinsically safe network switch for use in a hazardous area, as per claim 10, wherein power in said voltage clamping device is calculated as follows:

Power=Diode Voltage*(1+Diode Tolerance)*Fuse Current*Fuse Safety Factor.

14. The intrinsically safe network switch for use in a hazardous area, as per claim 10, wherein said intrinsically safe barrier further comprises blocking capacitors for high-voltage isolation.

15. The intrinsically safe network switch for use in a hazardous area, as per claim 10, wherein said fuse is used to limit power rating of said current limiting resistor, R, and said power rating given by:

Power Rating of '$R$'=$V_c^2/R$, wherein $V_c$ is the clamping voltage.

16. The intrinsically safe network switch for use in a hazardous area, as per claim 10, wherein said fuse is used to limit power rating of said current limiting resistor, R, and said power rating given by:

Power Rating of '$R$'=$I_F^2*R$, wherein $I_F$ is the fuse rating.

17. The intrinsically safe network switch for use in a hazardous area, as per claim 10, wherein said intrinsically safe network switch is used to provide an intrinsically safe data signal and an intrinsically safe power signal on the same cable using a Power-over-Ethernet (PoE) implementation over each output port.

18. An intrinsically safe barrier protecting an integrated circuit in a hazardous area, said integrated circuit performing Ethernet-based communications, said intrinsically safe barrier comprising:
  a. a fuse receiving an unsafe Ethernet signal from said integrated circuit;
  b. a voltage clamping device comprising:
    at least a first anti parallel diode pair arranged on top and electrically connected to a second anti parallel diode pair in a first column configuration;
    at least a third anti parallel diode pair arranged on top and electrically connected to a fourth anti parallel diode pair in a second column configuration;
    at least a fifth anti parallel diode pair arranged on top and electrically connected to a sixth anti parallel diode pair in a third column configuration;
  c. a current limiting resistance, wherein a value of said current limiting resistance depends on a clamping voltage value associated with said voltage clamping device,
  said first anti parallel diode pair only electrically connected to said fuse, said current limiting resistance, said second anti parallel diode pair, said third anti parallel diode pair, and said fifth anti parallel diode pair;
  said third anti parallel diode pair only electrically connected to said first anti parallel diode pair, said fourth anti parallel diode pair, said fifth anti parallel diode pair, said fuse, and said current limiting resistance;
  said fifth anti parallel diode pair only electrically connected to said first anti parallel diode pair, said third anti parallel diode pair, said sixth anti parallel diode pair, said fuse, and said current limiting resistance;
  wherein said intrinsically safe barrier, when used in conjunction with said integrated circuit, clamps input voltage and limits short circuit current to provide an intrinsically safe Ethernet signal.

19. The intrinsically safe barrier protecting an integrated circuit in a hazardous area, said integrated circuit performing network-based communications, as per claim 18, wherein said integrated circuit implements an Ethernet-based network switch.

20. The intrinsically safe barrier protecting an integrated circuit in a hazardous area, said integrated circuit performing network-based communications, as per claim 18, wherein said integrated circuit is used to provide both an intrinsically safe data signal and an intrinsically safe power signal.

21. An intrinsically safe network switch for use in a hazardous area, said network-based switch used to provide both an intrinsically safe data signal and an intrinsically safe power signal, said intrinsically safe network switch comprising:
  a. a power input working in conjunction with a first intrinsically safe barrier;
  b. an input port to receive an unsafe network input signal, said input port working in conjunction with a second intrinsically safe barrier;
  c. at least one output port to transmit a safe network output signal, said output port working in conjunction with a third intrinsically safe barrier, each of said first, second, and third intrinsically safe barriers further comprising:
    a fuse receiving an unsafe Ethernet signal from a first network device;
    a voltage clamping device comprising
    at least a first anti parallel diode pair arranged on top and electrically connected to a second anti parallel diode pair in a first column configuration;
    at least a third anti parallel diode pair arranged on top and electrically connected to a fourth anti parallel diode pair in a second column configuration;
    at least a fifth anti parallel diode pair arranged on top and electrically connected to a sixth anti parallel diode pair in a third column configuration;
    a current limiting resistance, wherein a value of said current limiting resistance depends on a clamping voltage value associated with said voltage clamping device, and
    said first anti parallel diode pair only electrically connected to said fuse, said current limiting resistance, said second anti parallel diode pair, said third anti parallel diode pair, and said fifth anti parallel diode pair;

said third anti parallel diode pair only electrically connected to said first anti parallel diode pair, said fourth anti parallel diode pair, said fifth anti parallel diode pair, said fuse, and said current limiting resistance;
said fifth anti parallel diode pair only electrically connected to said first anti parallel diode pair, said third anti parallel diode pair, said sixth anti parallel diode pair, said fuse, and said current limiting resistance;

wherein a value of said current limiting resistance depends on a clamping voltage value associated with corresponding voltage clamping device, and said first, second, and third intrinsically safe barriers clamp input voltage and limit short circuit current to provide an intrinsically safe output signal.

* * * * *

UNITED STATES PATENT AND TRADEMARK OFFICE
CERTIFICATE OF CORRECTION

PATENT NO. : 8,081,413 B2
APPLICATION NO. : 11/568567
DATED : December 20, 2011
INVENTOR(S) : Ajay Kothari et al.

It is certified that error appears in the above-identified patent and that said Letters Patent is hereby corrected as shown below:

Col 6, line 40, delete "LC" and insert therefore --I.C.--.

Signed and Sealed this
Tenth Day of July, 2012

David J. Kappos
*Director of the United States Patent and Trademark Office*